US009288161B2

(12) United States Patent
Ambalath et al.

(10) Patent No.: US 9,288,161 B2
(45) Date of Patent: Mar. 15, 2016

(54) VERIFYING THE FUNCTIONALITY OF AN INTEGRATED CIRCUIT (71) Applicant: INTERNATIONAL BUSINESS MACHINES CORPORATION, Armonk, NY (US)

(72) Inventors: Matayambath Roopesh Ambalath, Bangalore (IN); Carsten Greiner, Boeblingen (DE); Senthil K. Jayaraj, Bangalore (IN); Juergen Ruf, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 13/685,108

(22) Filed: Nov. 26, 2012

(65) Prior Publication Data
US 2013/0142063 A1    Jun. 6, 2013

(30) Foreign Application Priority Data

Dec. 5, 2011   (EP) .................................... 11191856

(51) Int. Cl.
H04N 11/04     (2006.01)
H04L 1/00      (2006.01)
H04L 12/939    (2013.01)
H04L 12/26     (2006.01)

(52) U.S. Cl.
CPC .............. *H04L 49/555* (2013.01); *H04L 43/10* (2013.01); *H04L 43/50* (2013.01)

(58) Field of Classification Search
CPC ......... H04L 43/50; H04L 12/26; H04L 29/06; H04L 1/1607; H04L 1/0061; H04L 69/22; H04L 49/555; H04L 12/56; H04L 43/10
USPC ............................................ 370/252, 240.27
See application file for complete search history.

(56) References Cited

U.S. PATENT DOCUMENTS

| 5,258,958 | A | * | 11/1993 | Iwahashi et al. .......... 365/185.21 |
| 5,517,510 | A | * | 5/1996 | Kuban et al. ................... 714/783 |
| 6,052,774 | A | * | 4/2000 | Segars et al. .................. 712/200 |
| 7,134,052 | B2 | * | 11/2006 | Bailey et al. ..................... 714/44 |
| 7,734,982 | B2 | * | 6/2010 | Wiatrowski et al. .......... 714/752 |
| 2002/0027556 | A1 | * | 3/2002 | Yamagishi et al. ............ 345/519 |
| 2002/0120829 | A1 | * | 8/2002 | Murakami et al. ............ 712/207 |
| 2003/0118022 | A1 | * | 6/2003 | Kulkarni et al. .............. 370/392 |
| 2004/0227205 | A1 | * | 11/2004 | Walmsley ...................... 257/499 |
| 2006/0026331 | A1 | * | 2/2006 | Kikuchi et al. ................ 710/313 |
| 2006/0268996 | A1 | * | 11/2006 | Sethi et al. ................ 375/240.27 |

(Continued)

Primary Examiner — Edan Orgad
Assistant Examiner — Vanneilian Lalchinthang
(74) Attorney, Agent, or Firm — Margaret A. McNamara, Esq.; Matthew M. Hulihan, Esq.; Heslin Rothenberg Farley & Mesiti P.C.

(57) ABSTRACT

Verifying the functionality of an integrated circuit, the integrated circuit being operable for processing a data packet thereby generating a data processing result. A data packet to be processed is evaluated to determine if the data packet is an erroneous data packet. If the data packet is identified as an erroneous data packet, a modified data packet is generated by modifying the erroneous data packet and providing the modified data packet to the integrated circuit. A determination is made as to whether the data processing result comprises the modification; and a malfunction of the integrated circuit is signaled, if the data processing result comprises the modification.

20 Claims, 3 Drawing Sheets

(56) References Cited

U.S. PATENT DOCUMENTS

| | | | |
|---|---|---|---|
| 2007/0082626 A1* | 4/2007 | Nomizo et al. | 455/117 |
| 2007/0083768 A1* | 4/2007 | Isogai et al. | 713/189 |
| 2009/0041389 A1* | 2/2009 | Kwon et al. | 382/309 |
| 2009/0213861 A1* | 8/2009 | Benner et al. | 370/400 |
| 2010/0192051 A1* | 7/2010 | Kabulepa et al. | 714/807 |

* cited by examiner

VERIFYING THE FUNCTIONALITY OF AN INTEGRATED CIRCUIT

PRIOR FOREIGN APPLICATION

This application claims priority from European patent application number 11191856.1, filed Dec. 5, 2011, which is hereby incorporated herein by reference in its entirety.

BACKGROUND

An aspect of the present invention relates to data processing systems, and in particular, to verifying the functionality of an integrated circuit by using data modification.

Hardware components like a chip may act as a bridge between two different interfaces. Such a component may continuously receive data packets via a source interface to store them in a host memory via a second interface. The address of each of the incoming data packets at the source interface is translated to a physical address on the host memory. In most of the cases, address translation mechanisms are based on scatter-gather lists. These lists are used for storing the locations of the data packets in the host memory and for describing how the request is placed in the host memory. If there is any error detected on any of the data packets received on the source interface, that data packet should be discarded and should not be sent to the host side.

Correct operation of such a chip can be checked by verifying whether it is dropping the erroneous packets and not sending them to the host memory. This is done in current methods by using information stored in an address translation table, and by a bookkeeping of the number of packets on the source side. The software based on this translation-table testing approach tends to be cumbersome and complex.

BRIEF SUMMARY

Embodiments of the invention provide for an improved computer-implemented method, data processing system and corresponding computer-readable storage medium.

One aspect of the invention relates to a method for verifying the functionality of an integrated circuit, the integrated circuit being operable for processing a data packet thereby generating a data processing result, the method comprising: evaluating the data packet to be processed for determining if the data packet is an erroneous data packet; if the data packet is identified as an erroneous data packet, generating a modified data packet by modifying the erroneous data packet and providing the modified data packet to the integrated circuit; determining if the data processing result comprises the modification; and signaling a malfunction of the integrated circuit if the data processing result comprises the modification.

In another aspect, the invention relates to a data processing system for verifying the functionality of an integrated circuit, the integrated circuit being operable for processing a data packet thereby generating a data processing result, the system comprising: an evaluating unit adapted for evaluating the data packet to be processed for determining if the data packet is an erroneous data packet; a unit adapted for generating a modified data packet by modifying the erroneous data packet and providing the modified data packet to the integrated circuit in case the data packet is identified as an erroneous data packet; a determining unit adapted for determining if the data processing result comprises the modification; and a signaling unit adapted for signaling a malfunction of the integrated circuit if the data processing result comprises the modification.

BRIEF DESCRIPTION OF THE SEVERAL VIEWS OF THE DRAWINGS

In the following, embodiments of aspects of the invention will be described in greater detail by way of example only making reference to the drawings in which.

DETAILED DESCRIPTION

As used herein, the term "data integrity checker," refers to a collection of program routines that detects whether there has been modification of data, or tampering. In one example, the service detects only whether data has been modified; it does not restore data to its original state if it has been modified.

The term "data packet," as used herein refers to any unit of data that is transferred from a sender to a receiver, e.g. within a communication system or between different communication systems. The structure of a data packet may depend on the protocol.

The term "fetch command," as used herein is a request for specific information to be retrieved from a computer-readable storage medium.

The expression "injecting a data pattern into a data packet" as used herein refers to a process of substituting an existing data section of a data packet by the injected data pattern, thereby causing a modification of the data packet.

The term "chip," as used herein refers to an integrated circuit chip. Circuits and circuitry may comprise general or specific purpose hardware, or may comprise hardware and associated software such as firmware or object code. In one example, a chip may be an ASIC (Application Specific Integrated Circuit).

An integrated circuit as used herein refers to a circuitry specifying program logic to be executed in a chip. An integrated circuit as used herein may be hardware-based, firmware-based and/or software-based. In case the integrated circuit is hardware-based, it may also be referred to as IC or microcircuit, i.e., a miniature electronic circuit that may consist of semiconductor devices and other hardware components. According to embodiments the program logic may be software based and may be used during design time of a chip for testing purposes before a particular chip design is used for production.

The term "bus interface," is commonly used to mean any of the bus or circuit elements between an integrated circuit and peripheral components. The peripheral components may be, for example, storage devices, network connections, circuits, etc.

The term "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, punched tape, punch cards, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example data may be retrieved over a modem, over the internet, or over a local area network. References to a computer-readable storage medium should be interpreted as possibly comprising multiple computer-readable storage mediums. Various executable components of a program or programs may be stored in different locations. The computer-readable storage medium may for instance comprise multiple computer-readable storage medium within the same computer system. The computer-readable storage medium may also be computer-readable storage medium distributed amongst multiple computer systems or computing devices.

The term "host memory" as used herein is a computer-readable storage medium which is accessible by a processor. The storage medium may be transitory or non-transitory. Examples of a host memory include, but are not limited to: RAM memory, registers, and register files. In some instances a host memory may also include: a hard disk drive, a floppy drive or a solid state hard drive. For instance, part of a host memory may in fact be swap space on a hard drive. References to "host memory" or "memory" should be interpreted as possibly comprising multiple memories. The memory may for instance comprise multiple memories within the same computer system. The memory may also comprise multiple memories distributed amongst multiple computer systems or computing devices.

In the following, like numbered elements in the figures are either similar elements or perform an equivalent function. Elements which have been discussed previously will not necessarily be discussed in later figures if the function is equivalent.

Figure 1:
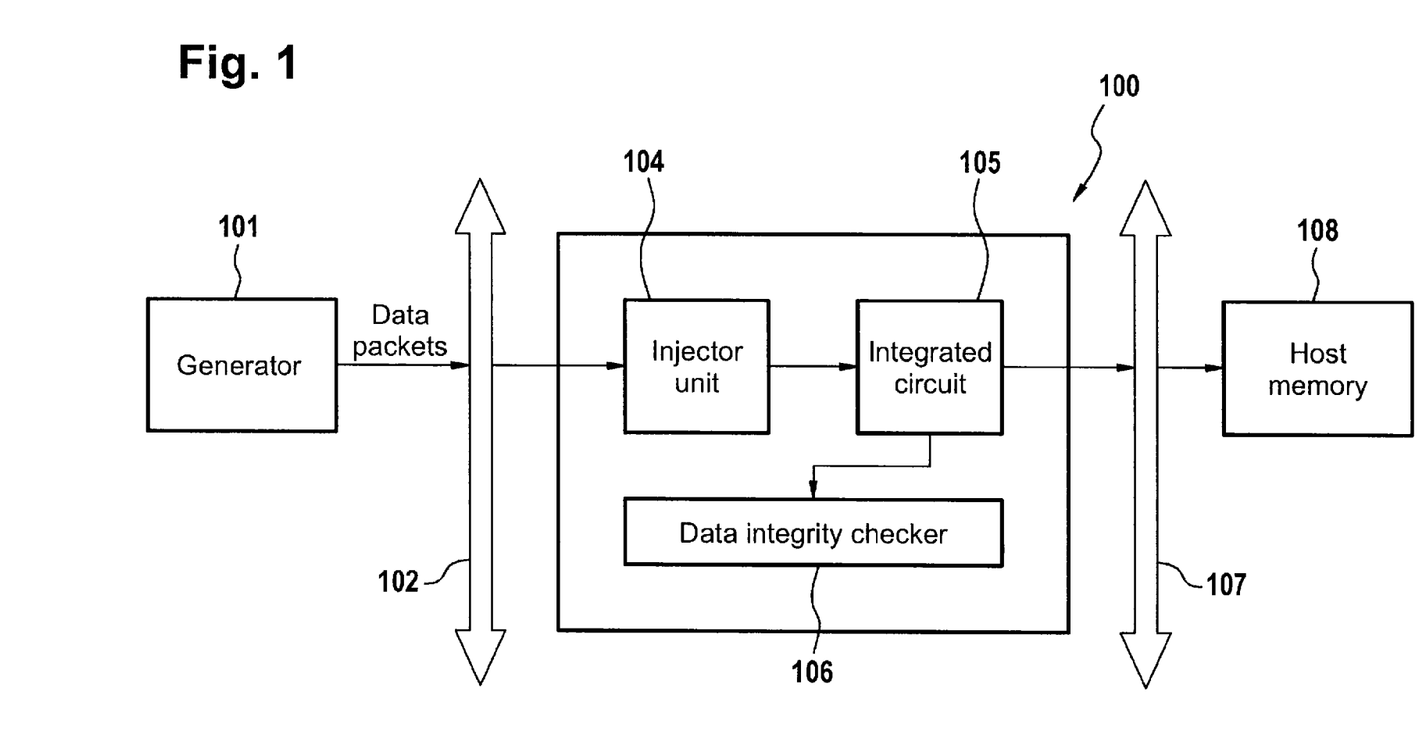
FIG. 1 is a block diagram schematically showing the arrangement of a testing software module.

FIG. 1 is a block diagram of a device for verifying the functionality of an integrated circuit 105. A testing module 100 acts as a bridge between a first interface 102 and a second interface 107. The first interface may be, for example, a Peripheral Component Interface (PCI) or InfiniBand bus. The second interface may be a host memory interface. The module 100 comprises an injector unit 104, the integrated circuit 105 and a data integrity checker 106. The module 100 is connected to a data generator section 101 via the first interface 102, and to a host memory 108 via the second interface 107.

The data generator section 101 generates a set of test data packets. The data generator section 101 injects errors, e.g. in a random or pseudo-random fashion, in one or more of the test data packets to create erroneous data packets. An erroneous data packet can be, for example, a data packet with wrong control data or incorrect checksum information. The data generator section 101 delivers at least one of the test data packets as a data packet to the testing module 100 via the first interface 102.

Upon receiving the data packet, evaluating it, and identifying it as an erroneous data packet, the injector unit 104 generates a modified data packet by modifying the erroneous data packet. The modification can be done, for example and without limitation, by modifying (also referred to as 'corrupting') the erroneous data packet. The modification comprises an injection of a predefined data pattern into the payload portion or flipping of one or more bits in the payload portion. As a result, the payload of the modified data packet is different from the payload portion of the original data packet.

The injector unit 104 delivers the modified data packet as input to the integrated circuit 105 of the testing module 100. The integrated circuit 105 provides, for example, a path for the data packet received via the first interface 102 and transferred to the host memory 108 via the second interface 107, and handles processing, such as IPsec processing, for the data packet. The integrated circuit 105 outputs a data processing result.

The data processing result is then verified by the data integrity checker 106, which checks whether a payload portion of the data processing result comprises the data pattern. This is done by comparing at least a part of the data packet with the data processing result. The testing module 100 is configured such that the data processing result is transferred to the host memory 108 via the second interface 107.

Figure 2:
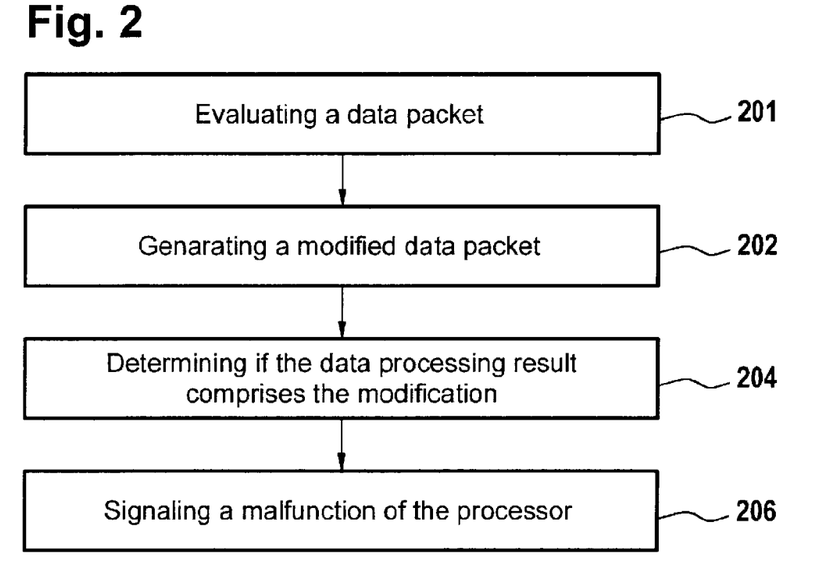
FIG. 2 is a flowchart of a data transfer process.

FIG. 2 is a flowchart of a method for verifying the functionality of an integrated circuit by using data modification. In evaluating step 201 the injector unit 104 reads the data packet arriving via the first interface 102 from the data generator section 101. The injector unit 104 monitors and verifies for the data packet having errors in the header portion or in the checksum information. On detecting an erroneous data packet, the injector unit, in modifying step 202, modifies the erroneous data packet to obtain a modified data packet. The modification can be performed, for example, by modifying the payload portion for that erroneous data packet. The modification is done by injecting a data pattern into the payload portion of the erroneous data packet or by flipping of one or more bits in the payload portion of the erroneous data packet. The data pattern can be randomly created to be different from the original payload portion of the data packet, which means that it is different from the data contained in the payload portion of the erroneous data packet. The data pattern can also be selected to be unique. The modified data packet is received by the integrated circuit 105 and processed resulting in a data processing result. In determining step 204 the data integrity checker 106 will check if the data processing result comprises the data pattern. This is done by comparing at least a part of the data packet with the data processing result. If the data processing result comprises the modification, i.e. here the data pattern, and is detected by the data integrity checker 106, the data integrity checker 106 signals in signaling step 206 a malfunction of the integrated circuit 105. The malfunction is signaled because the integrated circuit 105 is forwarding an erroneous data packet coming via the first interface 102 to the host memory 108 via the second interface 107. This is not desired since in normal operation the integrated circuit 105 should reject i.e. not process erroneous data packets.

Figure 3:
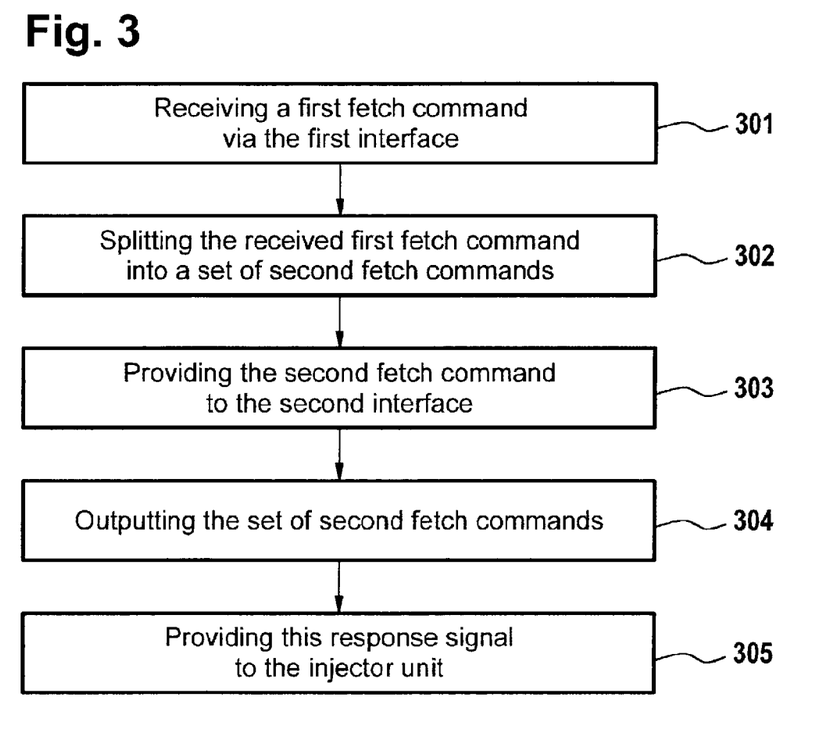
FIG. 3 is a flowchart depicting a use case.

FIG. 3 is a flowchart illustrating an example use case of an embodiment of the present invention. In a receiving step 301 a testing module 400 (FIG. 4) receives a first fetch command via the first interface 402 from the generator 401. In a splitting step 302, the first fetch command is split into multiple second fetch commands by the integrated circuit 405. In a providing command step 303, the testing module 400 provides the second fetch commands to the second interface 407. In an outputting step 304 the second fetch commands are output via the second interface 407. The execution of each of the second fetch commands results in the generation of a response signal. The response signals are retrieved via the second interface 407. The response signals are data messages or data packets respectively comprising a header portion and a payload portion. Each of the response signals indicates that the corresponding second fetch command triggered an error or was executed successfully, defining an error response signal or a good response signal respectively. An error or good response signal obtained as response to the one or multiple second fetch commands on the second interface 407 is propagated to the injector unit 404 in a providing response step 305 where it is evaluated in accordance with the evaluation of a data packet as described already with respect to FIG. 1 and FIG. 2. The payload portion of the error response signal is modified by the injector unit 404. The modification can be performed, for example, by modifying the payload portion for that error response signal. The modification may be done by injecting a data pattern, ideally a unique data pattern, into the payload portion of the error response signal.

Figure 4:
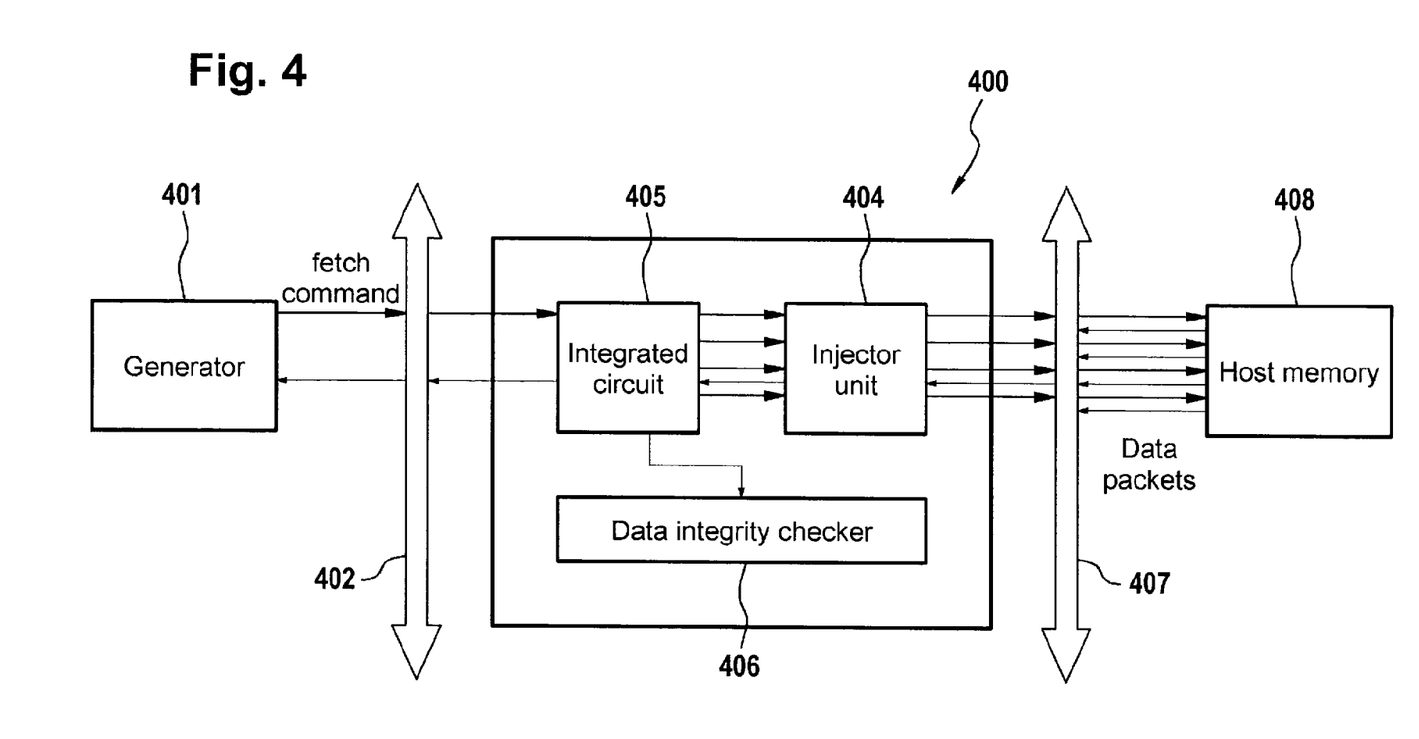
FIG. 4 is a block diagram schematically showing the arrangement of a testing software module according to a further embodiment.

The response signal is processed by the integrated circuit 405 and is evaluated by the data integrity checker 406. Next, the data integrity checker 406 determines whether the response signal comprises the modification, e.g., the injected data pattern, or not. The data integrity checker 406 signals an error of the integrated circuit 405, if the response signal comprises the data pattern. In this example the method of an aspect of the present invention is used to verify that the integrated circuit 405 is detecting and sending the error response signal having been received via the second interface 407 in response to the corresponding first fetch command. According to embodiments, at least the error response signals are forwarded to the first interface 402. In accordance with one embodiment, once the first interface 402 receives an error response signal, the first fetch command corresponding to this error response signal is resubmitted.

FIG. 4 illustrates a system arranged to implement a use case of an embodiment of the present invention. It shows a block diagram of a device for verifying the functionality of an integrated circuit 405. A testing module 400 acts as a bridge between a first interface 402 and a second interface 407. The first interface may be, for example, a PCI or InfiniBand bus. The second interface 407 may be a host memory interface. The testing module 400 comprises an injector unit 404, the integrated circuit 405 and a data integrity checker 406. The testing module 400 is connected to a data generator section 401 via the first interface 402, and to a host memory 408 via the second interface 407. The operation of the embodiment depicted in FIG. 4 is described in more detail in the above description of FIG. 3.

In one aspect, the invention relates to a method for verifying the functionality of an integrated circuit, the integrated circuit being operable for processing a data packet thereby generating a data processing result, the method comprising: evaluating the data packet to be processed for determining if the data packet is an erroneous data packet; if the data packet is identified as an erroneous data packet, generating a modified data packet by modifying the erroneous data packet and providing the modified data packet to the integrated circuit; determining if the data processing result comprises the modification; and signaling a malfunction of the integrated circuit if the data processing result comprises the modification.

Such embodiments may be advantageous in that the verification process execution is faster and more streamlined, which will reduce the resource consumption. This is due to the fact that the method does not require mapping of the bus addresses of the data packets to physical addresses in the host memory for the data packet recognition. Thus, there is no use of access to information of address translation tables that would slow down the process and make it more complex. Another advantage is that these embodiments can be implemented by reusing an existing data integrity checker, which can be present in a component of a data communication system involved with data input and/or output operations such as PCI bus interfaces. A component used in addition to the standard checking components is a unit for modifying the data packet.

According to another embodiment, the determining step comprises a comparison of at least a part of the data packet to be processed with the data processing result. According to another embodiment, the method further comprises: providing an injector unit and a data integrity checker, wherein the injector unit is evaluating the data packet, wherein the data integrity checker is determining if the data processing result comprises the modification and is signaling the malfunction, wherein the injector unit is injecting a data pattern into the payload portion of the erroneous data packet or flipping of one or more bits in the payload portion of the erroneous data packet for generating the modified data packet. This embodiment is advantageous in that it is a simplified architecture that can be implemented on the hardware with less technical difficulties. This advantage may apply in particular for hardware components already comprising a data integrity checker. The feature may be further advantageous as comparison operations, in particular bitwise comparison operations, can be executed more efficiently.

According to another embodiment, the method further comprises providing a module, wherein the module comprises a first interface and a second interface, wherein the integrated circuit is receiving the data packet via the first interface and is providing the data processing result via the second interface.

According to embodiments, the method may be implemented in the module as a software module, the software module comprising program logic simulating the processing logic of the integrated circuit. Program logic simulating the processing logic of the integrated circuit may also be referred to as 'chip design'. The features may be advantageous as the time for setting up chip design testing cycles before putting a chip into production may significantly be reduced. Another advantage may be that the features provide a checking environment of the chip which simulates real running conditions.

According to another embodiment the data packet is received via the first interface from a PCI bus. This is advantageous in that a PCI bus is required for most of the networks which transmit data, and cheap PCI cards are available. Using embodiments of the invention for evaluating the data transfer through a PCI bus thus provides for a facilitated way of guaranteeing that the transferred data packets are error-free.

According to another embodiment the data processing result is provided via the second interface to a host memory.

According to another embodiment, the data packet comprises a payload portion and a header portion, wherein the modified data packet is generated by modifying the payload portion of the erroneous data packet. According to embodiments, the modification comprises an injection of a predefined data pattern into the payload portion or flipping of one or more bits in the payload portion.

These embodiments may be advantageous, because the modification introduced into the payload portion of the erroneous data packet allows the system to keep track and easily recognize the modified data packet.

According to another embodiment, the data patterns of different data packets are selected to be different. This way the individual data packet can be recognized more easily at the evaluation step.

According to embodiments, the data packet is one of a plurality of data packets received from a plurality of different data sources. The modification of any of the data packets can be executed in dependence on the data source from which the respective data packet was received. For example, the injector unit may be operable to determine from which of a plurality of different data sources the data packet may have been received and may inject a data pattern being unique for the determined data source or a data pattern comprising a sub-pattern being unique for the determined data source. The features may be advantageous in that they allow tracking the source of an erroneous data packet without having to make use of an address translation table.

According to another embodiment, the method further comprises the steps of: generating a test data packet, wherein the test data packet is created as an erroneous data packet or as a non-erroneous data packet; and submitting the test data packet to the integrated circuit as the data packet to be evaluated.

According to another embodiment, the method further comprises the steps of: receiving a first fetch command via the first interface; splitting the received first fetch command into a set of second fetch commands; providing the second fetch commands to the second interface; outputting the set of second fetch commands via the second interface, wherein the outputting results in a set of response signals; and in case a response signal of the set of response signals indicates that a second fetch command of the set of second fetch commands triggered an error, providing this response signal to the injector unit as the data packet to be evaluated.

This embodiment may be advantageous, since the exact algorithm used to split up the commands between the interfaces does not need to be known. In fact, currently existing methods require to know the address translation method used inside the chip or chip design to determine how the commands from one interface are split up into multiple commands on the other interface. This information is then used to trace back the command on which the error happened on the destination side interface. Further, this is used to find out the corresponding command on the source side and to ensure that the error response is propagated to the source side on the correct fetch command.

According to another embodiment, the method further comprises the step of resubmitting and providing the first fetch command corresponding to this response signal.

Thus, the first fetch command from which the second fetch command which had triggered the error is identified and submitted again. This feature may be advantageous as it ensures that in case an error happened during execution of one of the second commands, only those first commands need to be resubmitted which actually correspond to the second command which could not be executed.

According to embodiments, the method further comprises providing the first interface and the second interface as PCI bus interfaces.

In a further aspect, the invention relates to a computer-readable non-transitory storage medium comprising computer-readable instructions which, when executed by a processor, cause the processor to perform the steps of any one of the above embodiments.

In another aspect, the invention relates to a data processing system for verifying the functionality of an integrated circuit, the integrated circuit being operable for processing a data packet thereby generating a data processing result, the system comprising: an evaluating unit adapted for evaluating the data packet to be processed for determining if the data packet is an erroneous data packet; a unit adapted for generating a modified data packet by modifying the erroneous data packet and providing the modified data packet to the integrated circuit in case the data packet is identified as an erroneous data packet; a determining unit adapted for determining if the data processing result comprises the modification; and a signaling unit adapted for signaling a malfunction of the integrated circuit if the data processing result comprises the modification.

According to embodiments, the processing system is a chip, e.g. an ASIC. The chip may comprise one or more processors. According to some embodiments, the chip may act as a bridge between a first and a second interface. The first interface may be a PCI bus or InfiniBand bus or another bus system or data transfer channel for transferring data. The data may be transferred, for example, to or from a hardware component such as, for example, a hard drive or any other storage device herein also referred to as 'host memory' accessible by the chip via the second interface. According to embodiments the processing of the data packet may encompass the determination to which memory block of the host memory a particular data packet should be stored when receiving the data packet as part of a write request via the first interface. According to further embodiments the processing of the data packet may encompass the determination from which memory block of the host memory a particular data packet should be read when executing a read request. Depending on the embodiment, the processing of the data packet may comprise determining an address of a memory block to which the data packet shall be stored or from which the data packet shall be read but may also comprise more complex data processing operations.

As will be appreciated by one skilled in the art, aspects of the present invention may be embodied as a system, method or computer program product. Accordingly, if not explicitly stated otherwise, aspects of the present invention may take the form of an entirely hardware embodiment, an entirely software embodiment (including firmware, resident software, micro-code, etc.) or an embodiment combining software and hardware aspects that may all generally be referred to herein as a 'module' or 'system'. Any combination of one or more computer-readable medium(s) may be utilized.

What is claimed is:
1. A method comprising:
verifying functionality of an integrated circuit to properly recognize an erroneous data packet as being erroneous, the verifying comprising:
initially obtaining, by another component separate from the integrated circuit, a data packet and evaluating, by the another component, the data packet to identify whether the data packet is an erroneous data packet, the data packet to be processed by the integrated circuit to thereby generate a data processing result;
based on the data packet being identified by the another component as an erroneous data packet, modifying, by the another component, the erroneous data packet to obtain a modified erroneous data packet, and providing the modified erroneous data packet to the integrated circuit, wherein the modifying provides the erroneous data packet with a modification;
based on the integrated circuit processing the modified erroneous data packet to generate the data processing result, receiving from the integrated circuit the data processing result;
identifying whether the integrated circuit properly recognized the erroneous data packet as being erroneous by checking whether the data processing result comprises the modification; and
signaling a malfunction of the integrated circuit to properly recognize the erroneous data packet as being erroneous, based on the data processing result comprising the modification.

2. The method of claim 1, wherein the checking comprises a comparison of at least a part of the data packet with the data processing result.

3. The method of claim 1, further comprising providing an injector unit and a data integrity checker, wherein the another component comprises the injector unit, wherein the data integrity checker checks whether the data processing result comprises the modification and signals the malfunction, and wherein the injector unit performs the modifying the erroneous data packet in which the injector unit injects a data pattern into the erroneous data packet to modify the erroneous data packet.

4. The method of claim 1, further comprising providing a module comprising the another component and the integrated circuit, wherein the module further comprises a first interface and a second interface, and wherein the integrated circuit receives the data packet via the first interface and provides the data processing result via the second interface.

5. The method of claim 4, wherein the data packet is received via the first interface from a Peripheral Component Interface bus.

6. The method of claim 4, wherein the data processing result is provided via the second interface to a host memory.

7. The method of claim 4, further comprising:
receiving a first fetch command via the first interface;
splitting the received first fetch command into a set of second fetch commands;
providing the second fetch commands to the second interface;
outputting the set of second fetch commands via the second interface, wherein the outputting results in a set of response signals; and
based on a response signal of the set of response signals indicating that a second fetch command of the set of second fetch commands triggered an error, providing this response signal to an injector unit as the data packet to be evaluated.

8. The method of claim 7, further comprising resubmitting and providing the first fetch command corresponding to this response signal.

9. The method of claim 1, wherein the data packet comprises a payload portion and a header portion, and wherein the modified erroneous data packet is generated by modifying the payload portion of the erroneous data packet.

10. The method of claim 1, wherein the modification comprises a data pattern injected into the data packet, wherein the evaluating, the modifying, and the verifying are performed for a plurality of different data packets, in which the data patterns injected into different data packets of the plurality of different data packets are selected to be different.

11. The method of claim 1, further comprising:
generating a test data packet, the test data packet being created as an erroneous data packet or as a non-erroneous data packet; and
submitting the test data packet to the integrated circuit as the data packet to be evaluated.

12. A data processing system comprising:
a memory; and
a processor in communications with the memory, wherein the data processing system is configured to perform a method, said method comprising:
verifying functionality of the integrated circuit to properly recognize the erroneous data packet as being erroneous, the verifying comprising:
initially obtaining, by another component separate from the integrated circuit, a data packet and evaluating, by the another component, the data packet to identify whether the data packet is an erroneous data packet, the data packet to be processed by the integrated circuit to thereby generate a data processing result;
based on the data packet being identified by the another component as an erroneous data packet, modifying, by the another component, the erroneous data packet to obtain a modified erroneous data packet, and providing the modified erroneous data packet to the integrated circuit, wherein the modifying provides the erroneous data packet with a modification;
based on the integrated circuit processing the modified erroneous data packet to generate the data processing result, receiving from the integrated circuit the data processing result;
identifying whether the integrated circuit properly recognized the erroneous data packet as being erroneous by checking whether the data processing result comprises the modification; and
signaling a malfunction of the integrated circuit to properly recognize the erroneous data packet as being erroneous, based on the data processing result comprising the modification.

13. The data processing system of claim 12, wherein the method further comprises providing a module comprising the another component and the integrated circuit, wherein the module further comprises a first interface and a second interface, and wherein the integrated circuit receives the data packet via the first interface and provides the data processing result via the second interface.

14. The data processing system of claim 13, wherein the method further comprises:
receiving a first fetch command via the first interface;
splitting the received first fetch command into a set of second fetch commands;
providing the second fetch commands to the second interface;
outputting the set of second fetch commands via the second interface, wherein the outputting results in a set of response signals; and
based on a response signal of the set of response signals indicating that a second fetch command of the set of second fetch commands triggered an error, providing this response signal to an injector unit as the data packet to be evaluated.

15. The data processing system of claim 12, wherein the data packet comprises a payload portion and a header portion, and wherein the modified erroneous data packet is generated by modifying the payload portion of the erroneous data packet.

16. The data processing system of claim 12, wherein the method further comprises:
generating a test data packet, the test data packet being created as an erroneous data packet or as a non-erroneous data packet; and
submitting the test data packet to the integrated circuit as the data packet to be evaluated.

17. A computer program product comprising:
a non-transitory computer readable storage medium readable by a processing circuit and storing instructions for execution by the processing circuit for performing a method comprising:
verifying functionality of the integrated circuit to properly recognize the erroneous data packet as being erroneous, the verifying comprising:

initially obtaining, by another component separate from the integrated circuit, a data packet and evaluating, by the another component, the data packet to identify whether the data packet is an erroneous data packet, the data packet to be processed by the integrated circuit to thereby generate a data processing result;

based on the data packet being identified by the another component as an erroneous data packet, modifying, by the another component, the erroneous data packet to obtain a modified erroneous data packet, and providing the modified erroneous data packet to the integrated circuit, wherein the modifying provides the erroneous data packet with a modification;

based on the integrated circuit processing the modified erroneous data packet to generate the data processing result, receiving from the integrated circuit the data processing result;

identifying whether the integrated circuit properly recognized the erroneous data packet as being erroneous by checking whether the data processing result comprises the modification; and signaling a malfunction of the integrated circuit to properly recognize the erroneous data packet as being erroneous, based on the data processing result comprising the modification.

18. The computer program product of claim 17, wherein the method further comprises providing a module comprising the another component and the integrated circuit, wherein the module further comprises a first interface and a second interface, and wherein the integrated circuit receives the data packet via the first interface and provides the data processing result via the second interface.

19. The computer program product of claim 18, wherein the method further comprises:

receiving a first fetch command via the first interface;

splitting the received first fetch command into a set of second fetch commands;

providing the second fetch commands to the second interface;

outputting the set of second fetch commands via the second interface, wherein the outputting results in a set of response signals; and based on a response signal of the set of response signals indicating that a second fetch command of the set of second fetch commands triggered an error, providing this response signal to an injector unit as the data packet to be evaluated.

20. The computer program product of claim 17, wherein the method further comprises:

generating a test data packet, the test data packet being created as an erroneous data packet or as a non-erroneous data packet; and submitting the test data packet to the integrated circuit as the data packet to be evaluated.

\* \* \* \* \*